US008859156B2

(12) United States Patent
Shigezumi et al.

(10) Patent No.: US 8,859,156 B2
(45) Date of Patent: Oct. 14, 2014

(54) SOLID OXIDE FUEL CELL

(75) Inventors: Tsukasa Shigezumi, Kitakyushu (JP);
Toshiharu Ooe, Kitakyushu (JP);
Katsuhisa Tsuchiya, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 359 days.

(21) Appl. No.: 13/262,135

(22) PCT Filed: Mar. 31, 2010

(86) PCT No.: PCT/JP2010/055915
§ 371 (c)(1),
(2), (4) Date: Sep. 29, 2011

(87) PCT Pub. No.: WO2010/114048
PCT Pub. Date: Oct. 7, 2010

(65) Prior Publication Data
US 2012/0015271 A1  Jan. 19, 2012

(30) Foreign Application Priority Data

Mar. 31, 2009 (JP) .................. 2009-087230
Oct. 23, 2009 (JP) .................. 2009-244243

(51) Int. Cl.
*H01M 8/04* (2006.01)
*H01M 8/12* (2006.01)

(52) U.S. Cl.
CPC ...... *H01M 8/04619* (2013.01); *H01M 8/04753* (2013.01); *H01M 8/04701* (2013.01); *Y02E 60/50* (2013.01); *Y02E 60/525* (2013.01); *H01M 2008/1293* (2013.01)
USPC ....................................... 429/430

(58) Field of Classification Search
CPC .............. H01M 8/04619; H01M 8/04753; H01M 8/04701
See application file for complete search history.

(56) References Cited

U.S. PATENT DOCUMENTS

2006/0014063 A1  1/2006 Kokubo
2010/0203408 A1  8/2010 Ono et al.

FOREIGN PATENT DOCUMENTS

JP         05-003041 A    1/1993
JP      2003-217627 A    7/2003
(Continued)

OTHER PUBLICATIONS

International Search Report for International Application No. PCT/JP2010/055915, dated Jul. 20, 2010, 2 pages.
(Continued)

*Primary Examiner* — Barbara Gilliam
*Assistant Examiner* — Stephan Essex
(74) *Attorney, Agent, or Firm* — Brinks Gilson & Lione

(57) ABSTRACT

To provide a solid oxide fuel cell capable of extending the time period over which a minimum rated output power can be maintained while restraining the advance of fuel cell module degradation.
The present invention is a solid oxide fuel cell (1), having a fuel cell module (2), a fuel supply device (38), an oxidant gas supply device (45), and a controller (110); wherein the controller is furnished with a degradation determining circuit for determining degradation (110*a*) and a fuel correction circuit for correcting operating condition (110*b*); in which the fuel correction circuit executes a correction to reduce rated output power so that the fuel supply amount is reduced when a determination is made that the fuel cell module has degraded, and when degradation of the fuel cell module advances and predetermined correction switching condition is satisfied, the fuel correction circuit corrects the fuel supply amount supplied to the fuel cell module so as to maintain the reduced rated output power.

4 Claims, 13 Drawing Sheets

(56) References Cited

FOREIGN PATENT DOCUMENTS

| | | |
|---|---|---|
| JP | 2004-164909 A | 6/2004 |
| JP | 2006-244821 A | 9/2006 |
| JP | 2007-087756 A | 4/2007 |
| JP | 2008-159362 A | 7/2008 |
| WO | WO 2008/155629 A1 | 12/2008 |

OTHER PUBLICATIONS

Written Opinion of the International Searching Authority for International Application No. PCT/JP2010/055915, dated Jul. 20, 2010, 4 pages.
International Preliminary Report on Patentability for International Application No. PCT/JP2010/055915, dated Nov. 15, 2011, 6 pages.
Extended European Search Report for European Application No. 10758819.6, dated Mar. 19, 2013, 7 pages.

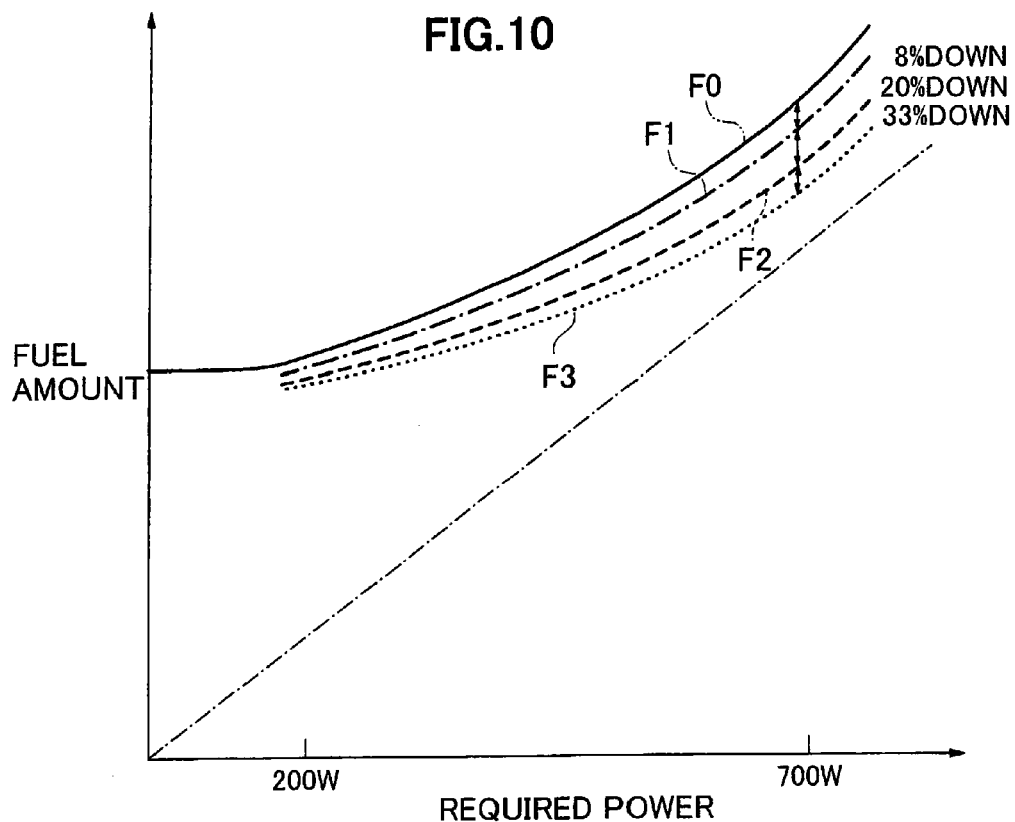
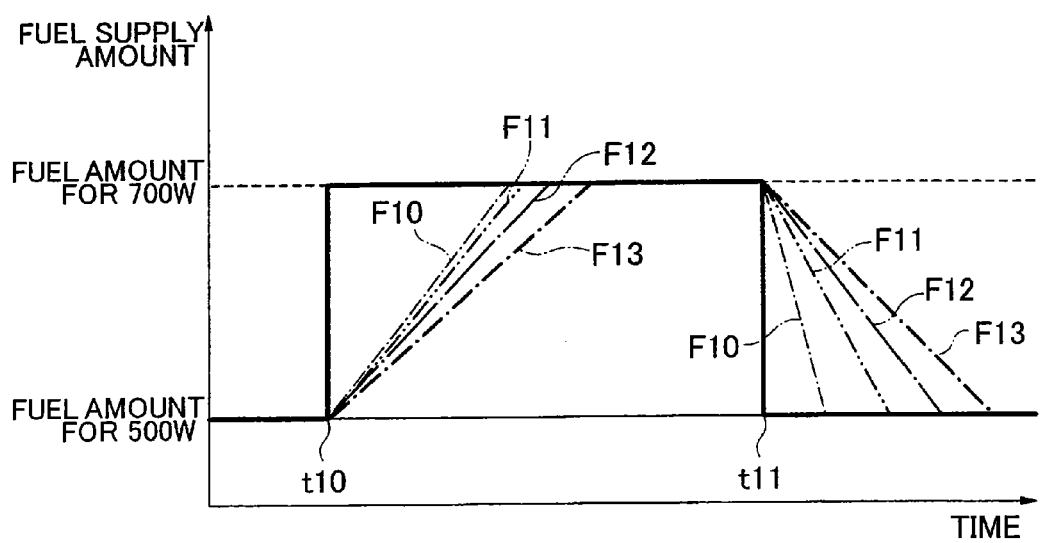

SOLID OXIDE FUEL CELL

TECHNICAL FIELD

The present invention relates to a solid oxide fuel cell.

BACKGROUND ART

Solid oxide fuel cells ("SOFCs" below) operate at relatively high temperatures, using an oxide ion conducting solid electrolyte as an electrolyte, with electrodes placed on both sides thereof, and with fuel gas supplied to one side thereof and oxidizer (air, oxygen, or the like) supplied to the other side thereof.

In such SOFCs, steam or $CO_2$ is produced by the reaction between oxygen ions passed through the oxide ion conducting solid electrolyte and fuel, thereby generating electrical and thermal energy. The electrical energy is extracted from the SOFC, where it is used for various electrical purposes. At the same time, thermal energy is used to raise the temperature of the fuel, SOFC, oxidant, and the like.

It is known that fuel cell units degrade with usage over long time periods. Unexamined Patent Application 2007-87756 (Patent Document 1) sets forth a solid oxide fuel cell. It is stated that in this fuel cell, degradation of the fuel cell units can be reduced by adjusting the flow rate of fuel.

A fuel supply amount control device, fuel supply amount control method, and electrical power supply system are also set forth in Unexamined Patent Application 2003-217627 (Patent Document 2). In this fuel supply amount control device, the amount of fuel supplied is compensated when the electrical power extractable from a predetermined amount of fuel supplied decreases due to degradation of fuel cell units.

In general, the electrical power extractable from degraded fuel cell unit is reduced relative to the same fuel supply amount. Therefore when the electrical power which can be extracted has declined, the fuel supply amount is compensated so that the fuel supply amount increases, thereby lengthening the time period over which an initial rated output power can be extracted from the fuel cell.

PRIOR ART REFERENCES

Patent References

Patent Document 1: Unexamined Patent Application 2007-87756
Patent Document 2: Unexamined Patent Application 2003-217627

SUMMARY OF THE INVENTION

Problems the Invention Seeks to Resolve

However, the problem arises that degradation of the fuel cell units is promoted by extraction of the initial rated output power by compensating to increase the fuel supply amount relative to degraded fuel cell units, therefore the time over which the fuel cell units can be used is actually shortened.

Also, because fuel cell units in which degradation has progressed have a reduced fuel-to-electrical power conversion efficiency, supplying a large amount of fuel to fuel cell units in which degradation has advanced in order to maintain rated output power leads to the problem of high fuel cell running cost.

Therefore the present invention has the object of providing a solid oxide fuel cell capable of extending the time period over which the minimum rated output power can be maintained, while restraining the advance of degradation of the fuel cell module.

Means for Resolving the Problems

In order to solve the above-described problem, the present invention is a solid oxide fuel cell having a fuel cell module furnished with multiple fuel cell units, a fuel supply device for supplying fuel to the fuel cell module, an oxidant gas supply device for supplying oxidant gas to the fuel cell module, and a controller for controlling the amount of fuel supplied from the fuel supply device; wherein the controller is provided with a degradation determining circuit for determining degradation in the fuel cell module, and with a fuel correction circuit for correcting operating condition based on the degradation determination made by the degradation determining circuit; whereby if it is determined by the degradation determining circuit that the fuel cell module degraded prior to the satisfaction of predetermined correction switching condition after the start of initial operation of the fuel cell module, the fuel correction circuit executes a correction to reduce the fuel supply amount supplied to the fuel cell module so that rated output power, which is the maximum power output from the fuel cell module, is reduced, while on the other hand, after degradation of the fuel cell module advances and the predetermined correction switching condition is satisfied, the fuel correction circuit corrects the fuel supply amount supplied to the fuel cell module so as to maintain the fuel cell module rated output power.

In the present invention thus constituted, the controller controls the fuel supply device and the oxidant gas supply device to supply fuel and oxidant gas to the fuel cell module. Also, the degradation determining circuit provided with a controller determines degradation in the fuel cell module and, when the fuel cell module is determined to have degraded, the fuel correction circuit executes a correction to decrease the rated output power so that the fuel supply amount is decreased. After a correction of this type is executed, if the fuel cell module degradation advances and the predetermined correction switching condition is satisfied, the fuel correction circuit corrects the fuel supply amount supplied to the fuel cell module so as to maintain the reduced rated output power.

In the present invention thus constituted, a correction is executed to reduce the rated output power so that the fuel supply amount is reduced when a degradation determination is made, therefore further advance of fuel cell module degradation is restrained. When degradation advances and correction switching condition is satisfied, the fuel supply amount is increased so as to maintain the reduced rated output power, therefore the time period over which the minimum rated output power is maintained can be extended.

In the present invention, the fuel correction circuit preferably executes a correction to reduce the amount of fuel supplied to the fuel cell module prior to the predetermined correction switching condition being met, and the range of fuel supply amount reduction in this correction is larger in corrections executed later than in corrections executed earlier.

In the present invention thus constituted, a correction to reduce the rated output power is executed before the correction switching condition is satisfied, therefore fuel cell module performance is prevented from declining, but at the initial period thereof the range of reduction in output power is reduced so that the decline in output is not noticeable. On the other hand, after degradation has progressed to some degree, the fuel supply amount is greatly reduced, and emphasis is placed on preventing further degradation of the fuel cell module. This makes it possible both to extend the number of years of usable fuel cell module life, and to maintain output power.

In the present invention, the fuel correction circuit preferably corrects the fuel supply amount supplied to the fuel cell module so that fuel cell unit temperatures do not rise before the predetermined correction switching condition is satisfied.

In the present invention thus constituted, corrections are executed so that the fuel cell unit temperature does not rise before the predetermined correction switching condition is satisfied. There is a tendency for solid oxide fuel cell temperatures to rise with the advance of degradation, and degradation of the solid oxide fuel cells may advance due to temperature rises. In the present invention, temperature rises are prevented and increased burden on the fuel cell units is avoided, therefore the degradation of fuel cell units can be delayed. This makes it possible to extend the number of years of usable fuel cell module life.

In the present invention the fuel correction circuit preferably corrects the fuel supply amount supplied to the fuel cell module so as to decrease the temperature of the solid oxide fuel cells before the predetermined correction switching condition is satisfied.

In the present invention thus constituted, corrections are executed so that the temperature of the solid oxide fuel cells declines before the predetermined correction switching condition is satisfied, therefore the burden on the solid oxide fuel cells is actively reduced, and fuel cell module usable life can be greatly extended.

In the present invention the predetermined correction switching condition is preferably a rise in the solid oxide fuel cell temperature to a predetermined correction switching temperature or above, a decrease in fuel supply amount to a predetermined correction switching fuel supply amount, a decrease in fuel cell module output power to a predetermined correction switching power or below, or a decrease in fuel cell module output voltage to a predetermined correction switching voltage or below.

In the present invention thus constituted, a determination of degradation of the fuel cell module can be made based on the temperature of the fuel cell units, which directly reflect fuel cell module degradation, and on the easily-detected fuel supply amount and output power or output voltage, which directly reflect a decline in fuel cell performance.

The present invention is a solid oxide fuel cell having a fuel cell module furnished with multiple fuel cell units, a fuel supply means for supplying fuel to the fuel cell module, an oxidant gas supply means for supplying oxidant gas to the fuel cell module, and a control means for controlling the amount of fuel supplied from the fuel supply means; wherein the control means is provided with a degradation determining means for determining degradation in the fuel cell module, and with a fuel correction means for correcting operating condition based on the degradation determination made by the degradation determining means; whereby if it is determined by the degradation determining means that the fuel cell module degraded prior to the satisfaction of predetermined correction switching condition after the start of initial operation of the fuel cell module, the fuel correction means executes a correction to reduce the fuel supply amount supplied to the fuel cell module so that rated output power, which is the maximum power output from the fuel cell module, is reduced, while on the other hand, after degradation of the fuel cell module advances and the predetermined correction switching condition is satisfied, the fuel correction means corrects the fuel supply amount supplied to the fuel cell module so as to maintain the fuel cell module rated output power.

Effect of the Invention

Using the solid oxide fuel cell of the present invention, the time period over which the minimum rated output power is maintained can be extended while restraining the advance of fuel cell module degradation.

BRIEF DESCRIPTION OF FIGURES

FIG. 10: A graph showing an example of the relationship between the required generation amount input to the control section and the fuel supply amount required to produce the required generation amount.

FIG. 11: A graph showing an example of the change over time in fuel supply amount relative to the change in required generation amount.

EMBODIMENTS OF THE INVENTION

Next, referring to the attached drawings, we discuss a solid oxide fuel cell (SOFC) according to an embodiment of the present invention.

Figure 1:
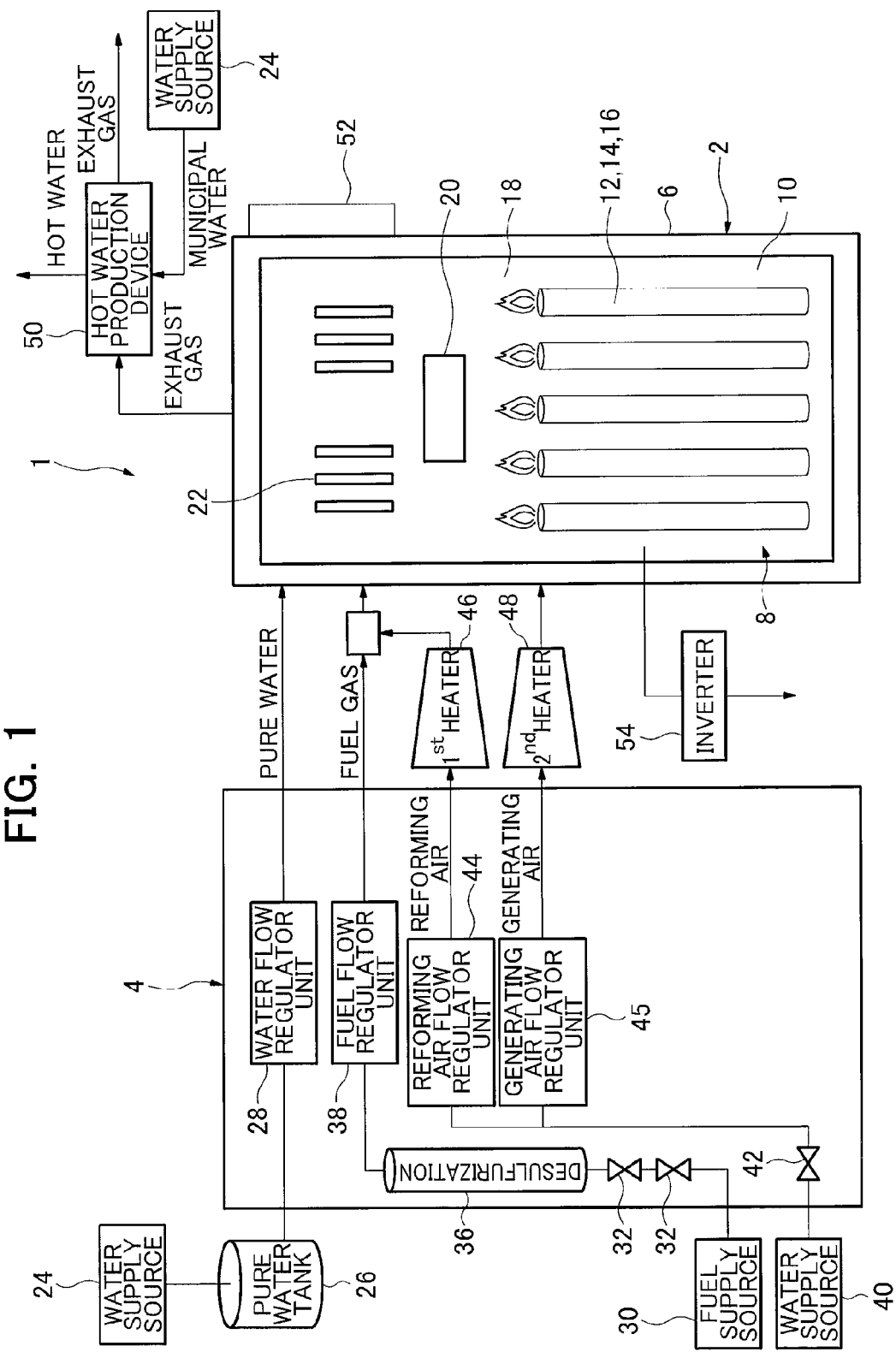
FIG. 1: An overall schematic showing a solid oxide fuel cell (SOFC) according to an embodiment of the present invention.

FIG. 1 is an overview diagram showing a solid oxide fuel cell (SOFC) according to an embodiment of the present invention.

As shown in FIG. 1, the solid oxide fuel cell (SOFC) of this embodiment of the present invention is furnished with a fuel cell module 2 and an auxiliary unit 4.

The fuel cell module 2 is furnished with a housing 6; a sealed space 8 is formed within the housing 6, mediated by insulating material (not shown; the insulating material is not an indispensable structure and may be omitted). Note that it is acceptable not to provide insulating material. A fuel cell assembly 12 for carrying out the electrical generating reaction between fuel gas and oxidant (air) is disposed in the generating chamber 10 at the lower portion of this sealed space 8. This fuel cell assembly 12 is furnished with ten fuel cell stacks 14 (see FIG. 5), and a fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the fuel cell module 2 sealed space 8; residual fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving combustion heat and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supply from a fuel supply source 30 such as municipal gas or the like, and a fuel flow rate regulator unit 38 (a "fuel pump" or the like driven by a motor) for regulating the flow rate of fuel gas. Furthermore, an auxiliary unit 4 is furnished with an electromagnetic valve 42 for shutting off air serving as an oxidizer supplied from an air supply source 40, a reforming air flow rate regulator unit 44 and generating air flow rate regulator unit 45 ("air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
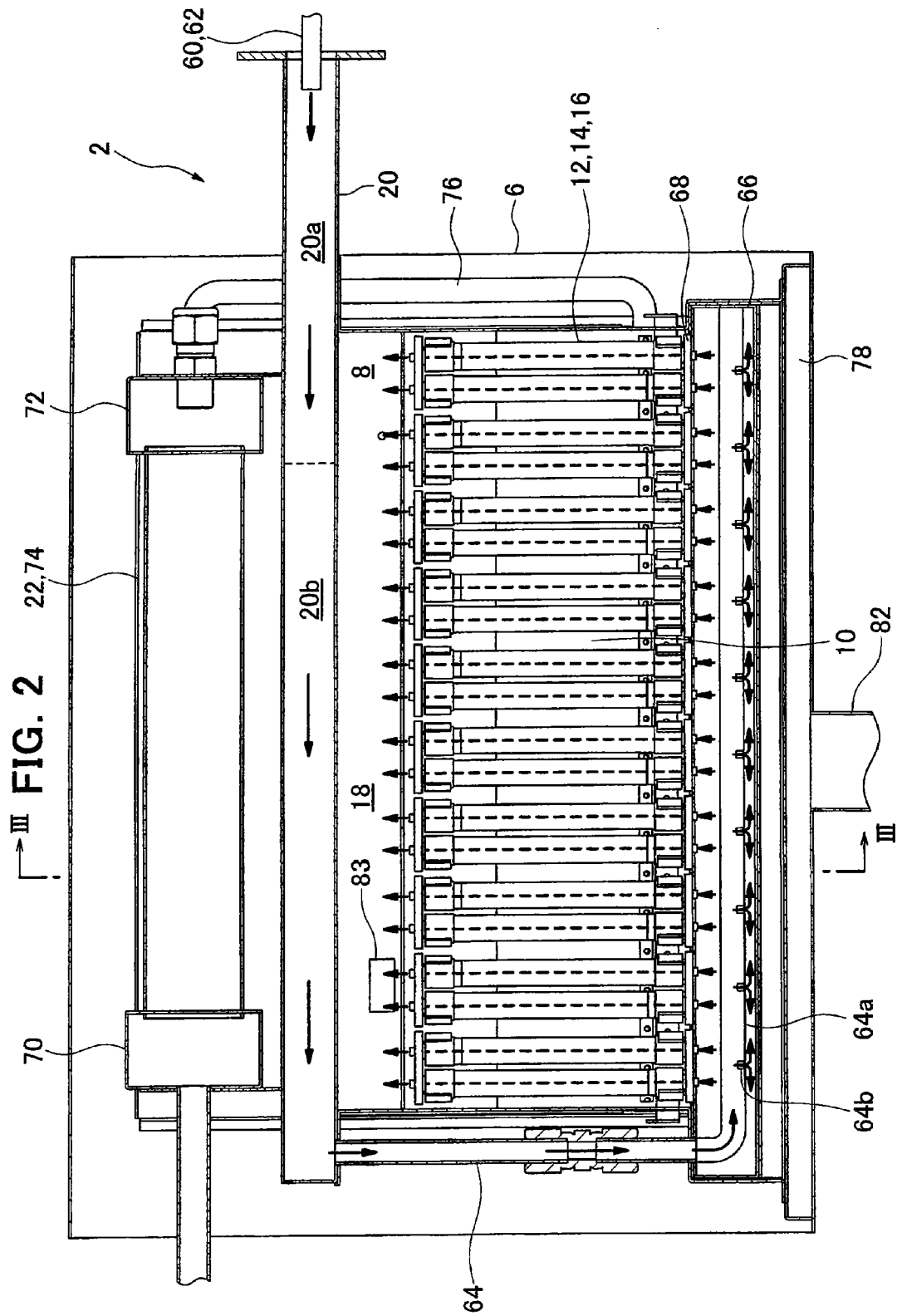
FIG. 2: A front elevation sectional diagram showing a solid oxide fuel cell (SOFC) fuel cell module according to an embodiment of the present invention.
Figure 3:
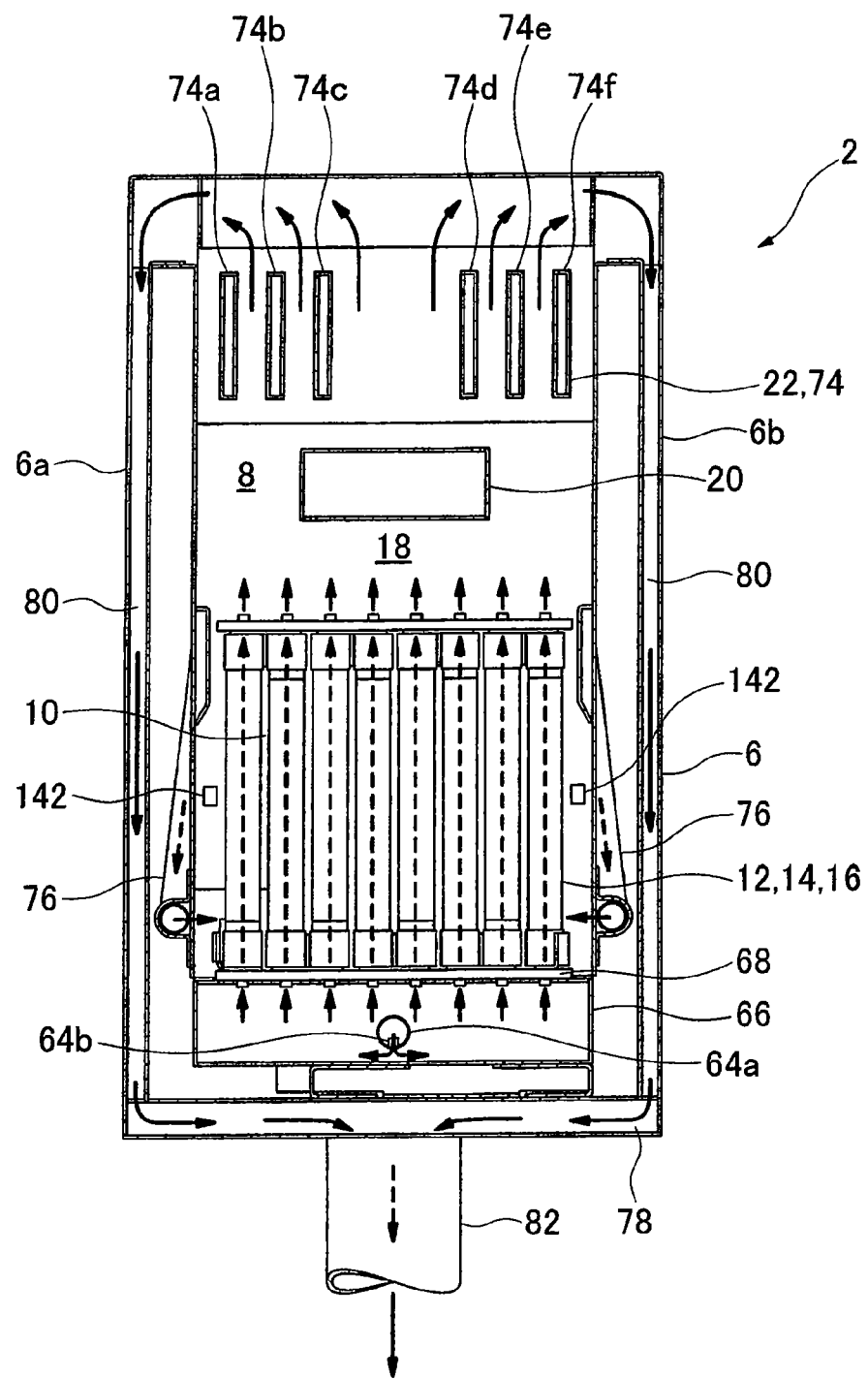
FIG. 3: A sectional diagram along line in FIG. 2.

The internal structure of the solid oxide fuel cell (SOFC) fuel cell module of this embodiment of the present invention is explained using FIGS. 2 and 3. FIG. 2 is a side elevation sectional diagram showing a fuel cell module in a solid oxide fuel cell (SOFC) according to an embodiment of the present invention; FIG. 3 is a sectional diagram along line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

Next, an air heat exchanger 22 is provided over the reformer 20. This air heat exchanger 22 is furnished with an air concentration chamber 70 on the upstream side and two air distribution chambers 72 on the downstream side; these air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
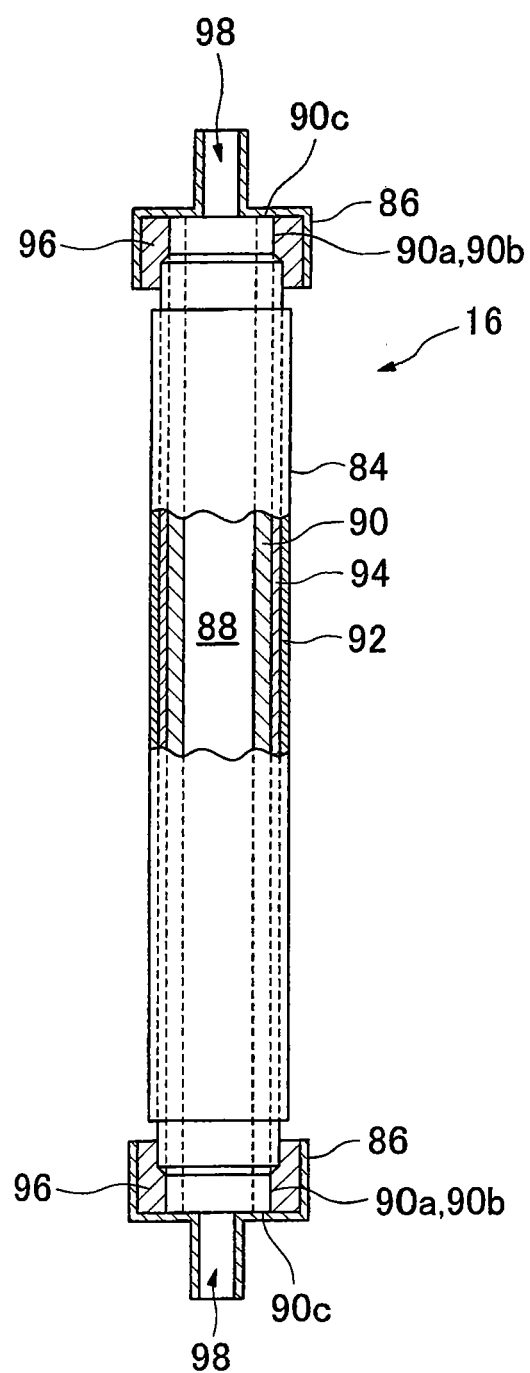
FIG. 4: A partial section showing a solid oxide fuel cell (SOFC) fuel cell unit according to an embodiment of the present invention.

Next we discuss the fuel cell unit 16, referring to FIG. 4. FIG. 4 is a partial section showing a solid oxide fuel cell (SOFC) fuel cell unit according to an embodiment of the present invention.

As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure, therefore we will here discuss specifically the internal electrode terminal 86 attached at the top end side. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
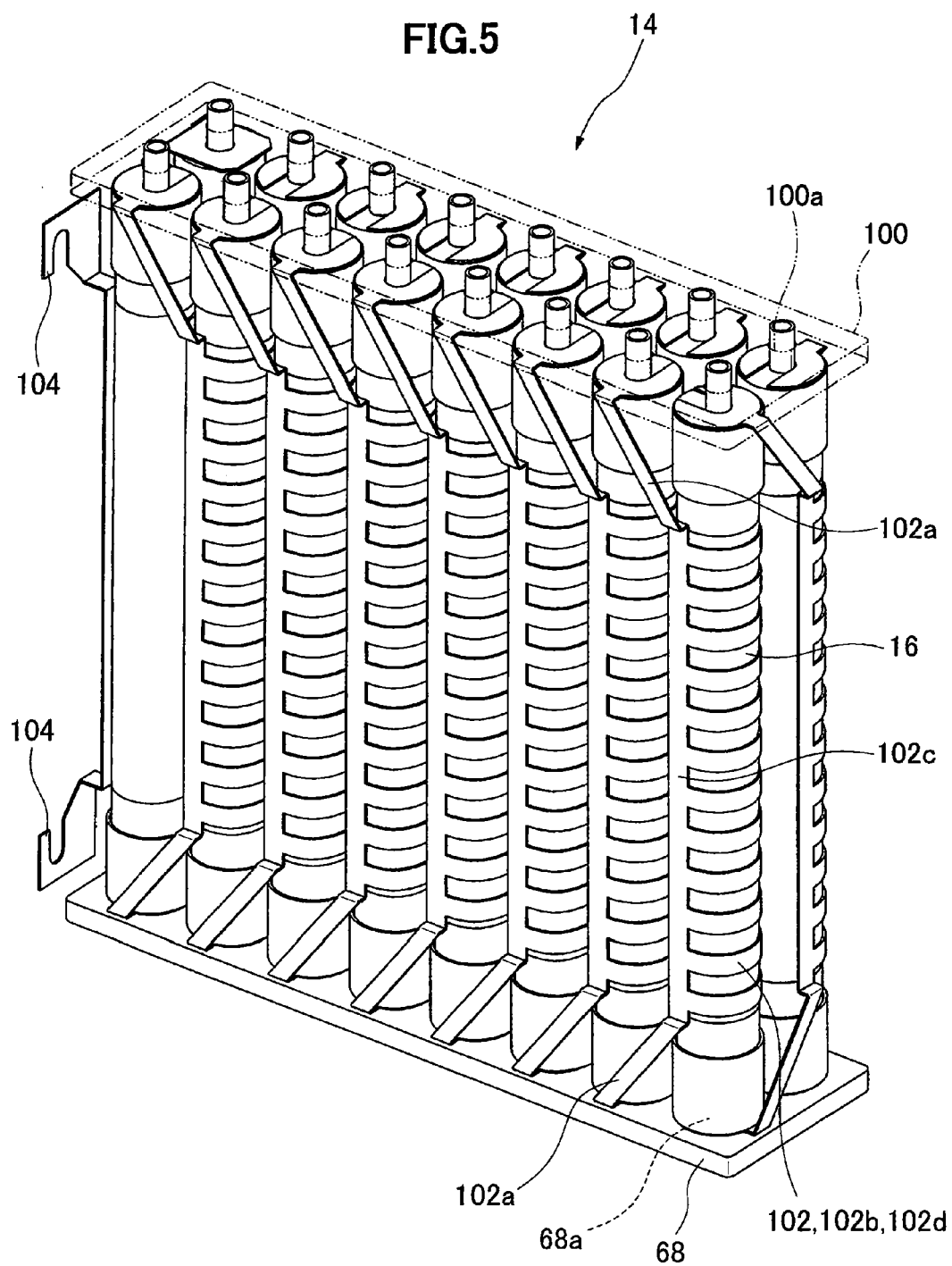
FIG. 5: A perspective diagram showing a solid oxide fuel cell (SOFC) fuel cell stack according to an embodiment of the present invention.

Next we discuss the fuel cell stack 14, referring to FIG. 5. FIG. 5 is a perspective view showing the fuel cell stack in a solid oxide fuel cell (SOFC) according to an embodiment of the present invention.

As shown in FIG. 5, the fuel cell stack 14 is furnished with sixteen fuel cell units 16; the top end side and bottom end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a current collector 102 and an external terminal 104 are attached to the fuel cell unit 16. This current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter surface of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from this vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14, and as described above, all of the 160 fuel cell units 16 are connected in series.

Figure 6:
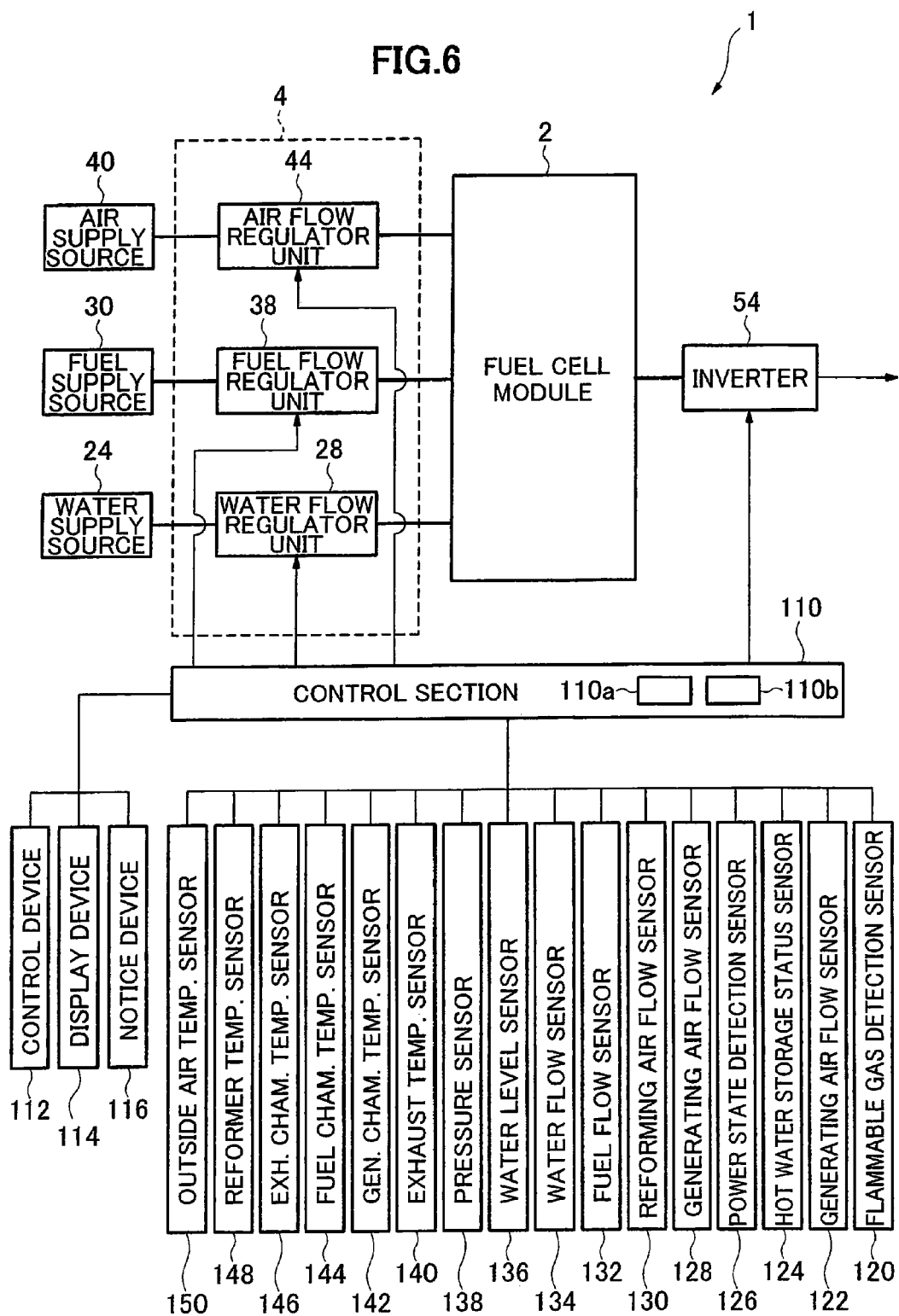
FIG. 6: A block diagram showing a solid oxide fuel cell (SOFC) according to an embodiment of the present invention.

Next, referring to FIG. 6, we discuss the sensors attached to the solid oxide fuel cell (SOFC) according to the present embodiment. FIG. 6 is a block diagram showing a solid oxide fuel cell (SOFC) according to an embodiment of the present invention.

As shown in FIG. 6, a solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to this control unit 110. This notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the CO gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow rate detection sensor 128 detects the flow rate of generator air supplied to the generating chamber 10.

A reforming air flow rate sensor 130 detects the rate of reforming air flow supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) is placed outdoors, the outside temperature sensor 150 detects the temperature of the outside atmosphere. Sensors to detect outside atmospheric humidity and the like may also be provided.

Signals from these various sensor types are sent to the control unit 110; the control unit 110 sends control signals to the water flow rate regulator unit 28, the fuel flow rate regulator unit 38, the reforming air flow rate regulator unit 44, and the generating air flow rate regulator unit 45 based on data from the sensors, and controls the flow rates in each of these units.

The control unit 110 sends control signals to the inverter 54 to control the amount of electrical power supply.

Figure 7:
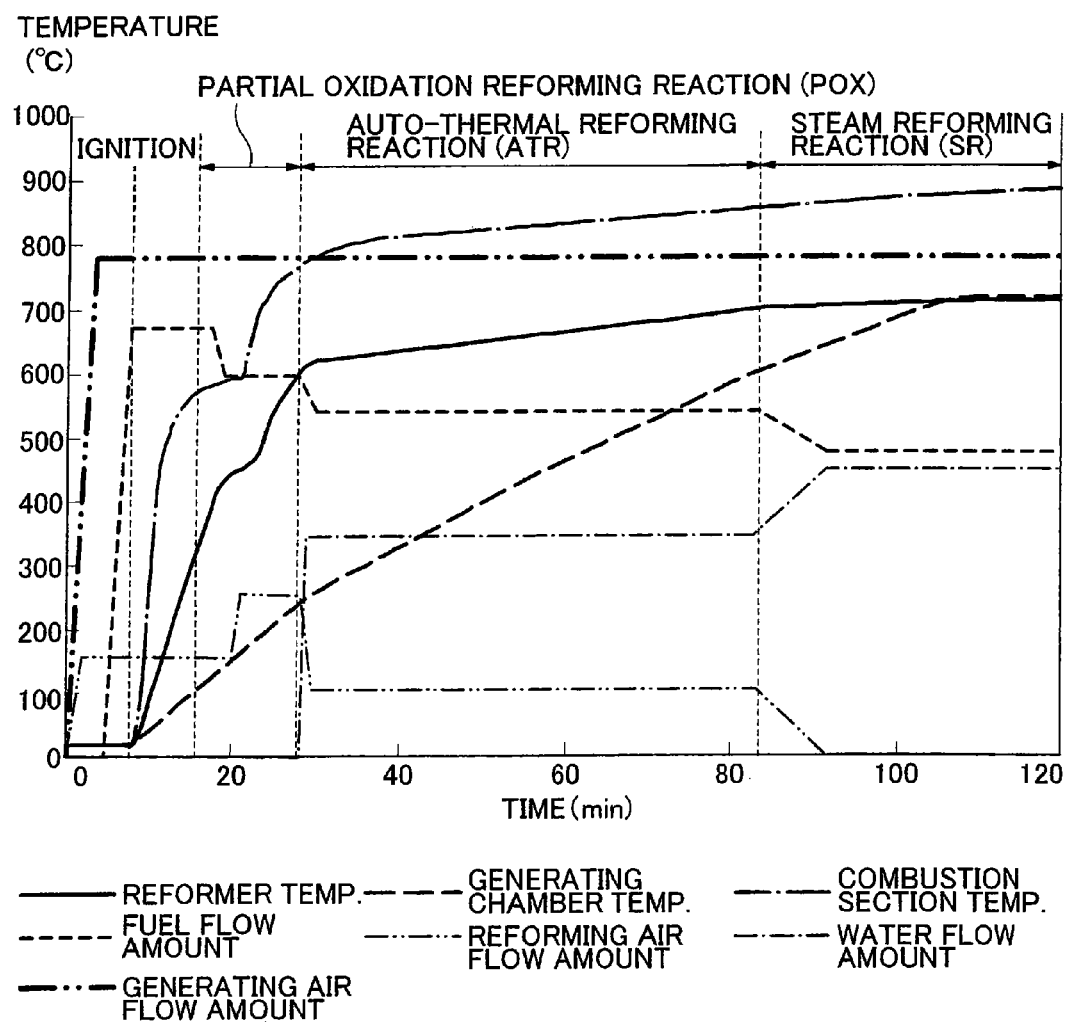
FIG. 7: A timing chart showing the operation at the time of startup of a solid oxide fuel cell (SOFC) according to an embodiment of the present invention.

Next, referring to FIG. 7, we discuss the operation of a solid oxide fuel cell (SOFC) according to the present embodiment at the time of start up.

FIG. 7 is a timing chart showing the operations of a solid oxide fuel cell (SOFC) according to an embodiment of the present invention at the time of start up.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 through a first heater 46 to the reformer 20 on the fuel cell module 2. At the same time, generating air is supplied from the generating air flow rate regulator unit 45 through a second heater 48 to the air heat exchanger 22 of the fuel cell module 2, and this generating air reaches the generating chamber 10 and the combustion chamber 18.

Immediately thereafter, fuel gas is also supplied from the fuel flow rate regulator unit 38, and fuel gas into which reform air is blended passes through the reformer 20, the fuel cell stack 14, and the fuel cell unit 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises in the fuel cell module 2 sealed space 8, the fuel gas, which includes reforming air in the reformer 20 is warmed, as is the generating air inside the air heat exchanger 22.

At this point, fuel gas into which reform air is blended is supplied to the reformer 20 by the fuel flow rate regulator unit 38 and the reforming air flow rate regulator unit 44, therefore the partial oxidation reforming reaction POX given by Expression (1) proceeds. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel stack 14 is also heated from above, enabling as a result an essentially uniform rise in temperature in the vertical direction of the fuel cell stack 14. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, no major drop in temperature will be caused. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

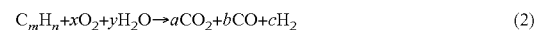

$$C_mH_n + xO_2 + yH_2O \rightarrow aCO_2 + bCO + cH_2 \qquad (2)$$

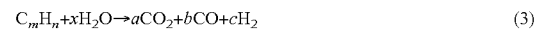

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the combustion heat from the combustion chamber 18. At this stage, the fuel cell module is in the final stages of startup, therefore the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, an amount of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
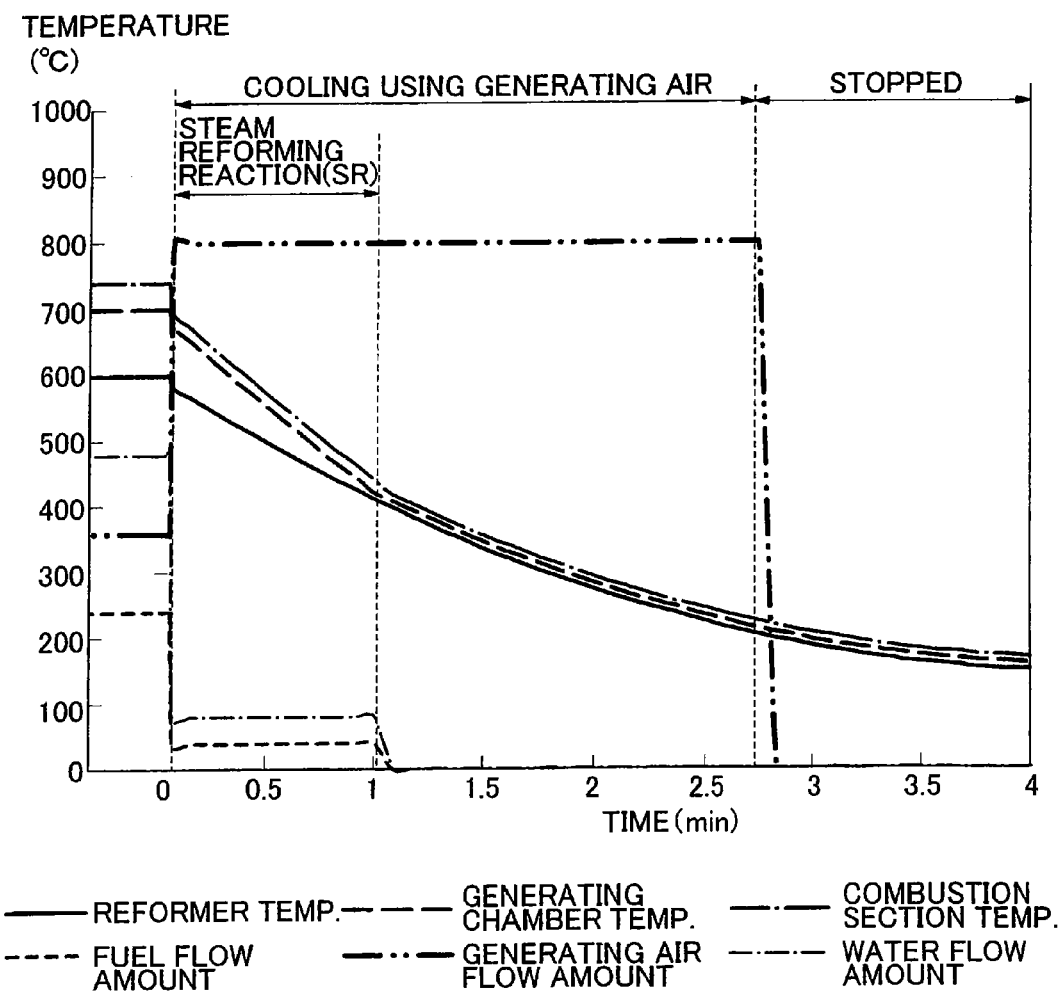
FIG. 8: A timing chart showing the operation at the time of shutdown of a solid oxide fuel cell (SOFC) according to an embodiment of the present invention.

Next, referring to FIG. 8, we discuss the operation upon stopping the solid oxide fuel cell (SOFC) of the present embodiment. FIG. 8 is a timing chart showing the operations which occur upon stopping the solid oxide fuel cell (SOFC) of the present embodiment.

As shown in FIG. 8, when stopping the operation of the fuel cell module 2, the fuel flow rate regulator unit 38 and the water flow rate regulator unit 28 are first operated to reduce the amount of fuel gas and steam being supplied to the reformer 20.

When stopping the operation of the fuel cell module 2, the amount of generating air supplied by the reforming air flow rate regulator unit 44 into the fuel cell module 2 is being increased at the same time that the amount of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e.g. 200° C.; when the predetermined temperature is reached, the supply of generating air from the generating air flow rate regulator unit 45 is stopped.

Thus in the present embodiment the steam reforming reaction SR by the reformer 20 and cooling by generating air are used in combination, therefore when the operation of the fuel cell module 2 is stopped, that operation can be stopped relatively quickly.

Next, referring to FIGS. 9 through 14, we discuss the operation of the solid oxide fuel cell 1 according to an embodiment of the present invention.

First, referring to FIGS. 9 through 12, we discuss the load following operation of the solid oxide fuel cell 1 and the fuel cell module 2 degradation determination.

Figure 9:
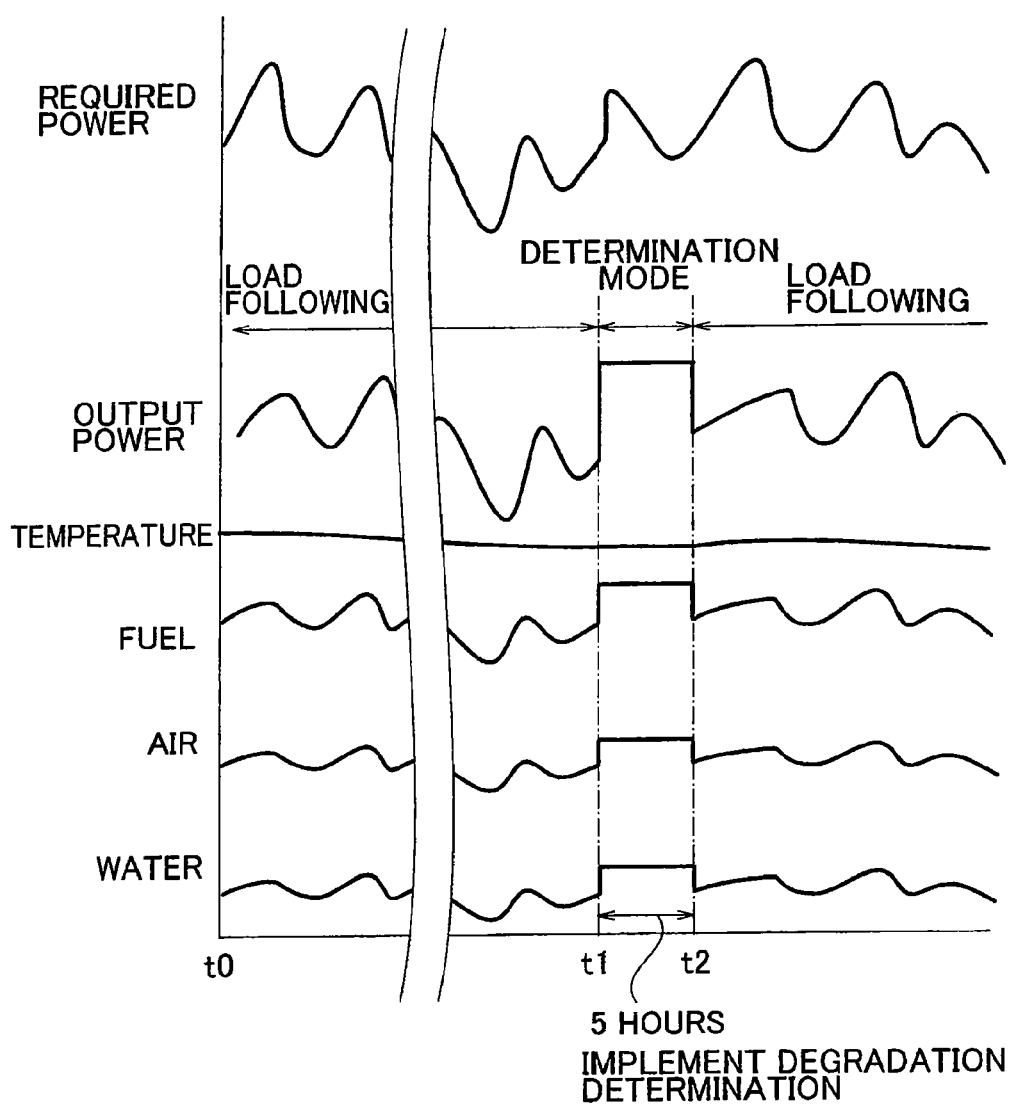
FIG. 9: A timing chart explaining the determination of degradation in a solid oxide fuel cell (SOFC) according to an embodiment of the present invention.
Figure 12:
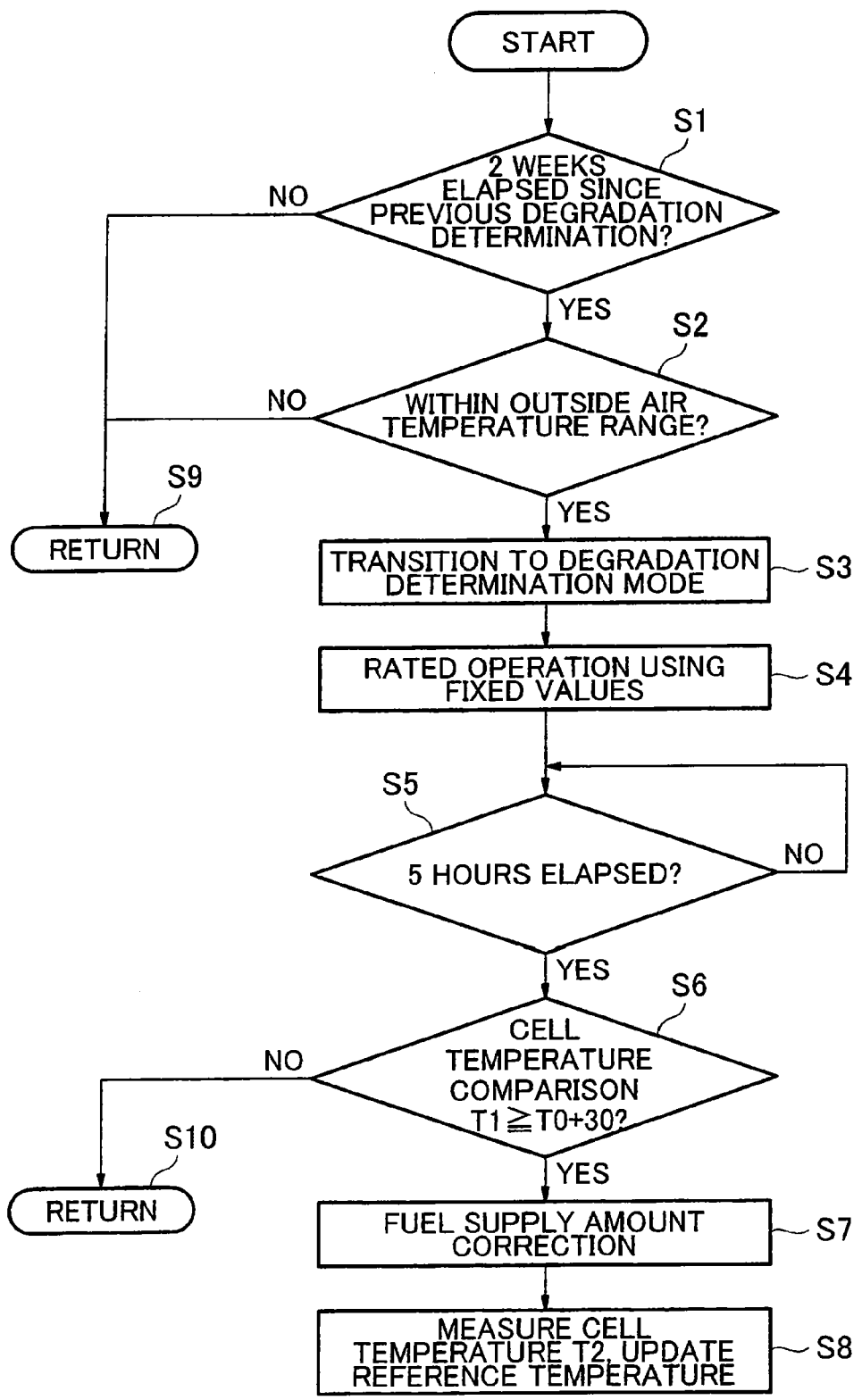
FIG. 12: A flow chart showing a degradation determination procedure using a degradation determining circuit.

FIG. 9 is a timing chart explaining the determination of degradation in a solid oxide fuel cell (SOFC) according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 12 is a flow chart showing a degradation determination procedure using a degradation determining circuit.

At times t0-t1 in FIG. 9, the solid oxide fuel cell 1 is performing a load following operation so that an output power can be obtained in accordance with the amount of generation required by the inverter 54 (FIG. 6). As shown in FIG. 6, that is, the control section 110 serving as controller sends signals to the fuel flow rate regulator unit 38 serving as fuel supply device, the generating air flow rate regulator unit 45 serving as oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell 1 thus varies, as shown in FIG. 9, so as to follow the amount of generation required from the inverter 54. Here a delay is applied to the output power response relative to the amount of fuel supplied, etc.; the output power changes with a delay relative to changes in the fuel supply amount, etc., and there is almost no change in output power relative to sudden changes in the amount of generation required. Note that the control section 110, the fuel flow rate regulator unit 38, the generating air flow rate regulator unit 45, and the water flow rate regulator unit 28 respectively function as a control means, a fuel supply means, an oxidant gas supply means, and a water supply means.

The control section 110 determines the fuel supply amount using a graph, one example of which is shown in FIG. 10, in response to the amount of generation required from the inverter 54 and controls the fuel flow rate regulator unit 38 such that the determined amount (flow rate) of fuel is supplied to the fuel cell module 2. After the initial start of use of the solid oxide fuel cell 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

When the required generation amount is changed, sudden changes in the fuel supply amount can hasten degradation of the fuel cell module 2, therefore the fuel supply amount is gradually increased or decreased as shown in FIG. 11. FIG. 11 is a graph showing an example of the change in fuel supply amount versus time when the required generation amount is changed in a stepped manner from 500 W to 700 W. As shown in FIG. 11, when the required generation amount is changed from 500 W to 700 W at time t10, the required fuel supply amount is suddenly changed from a fuel supply amount for an output power of 500 W to one corresponding to 700 W. In response, the control section 110 controls the fuel flow rate regulator unit 38 so that the fuel supply amount is increased slowly, as shown by the imaginary line in FIG. 11, to avoid a sudden increase in the fuel supply amount. Note that after the initial start of use of the solid oxide fuel cell 1, up until a determination is made that the fuel cell module 2 has degraded, the control section 110 increases the fuel supply amount in accordance with the line F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change in the fuel supply amount is set to be more gradual when increasing the fuel supply amount than when decreasing it.

Note that FIGS. 10 and 11 relate to fuel supply amount, but changes occur similarly in the air supply amount and water supply amount relative to the required generation amount.

Next, at time t1 in FIG. 9, the degradation determining circuit 110a serving as degradation determining means built into the control section 110 starts operation of the degradation determining mode (FIG. 6). Note that the degradation determining circuit 110a comprises a microprocessor, a memory, a program for activating same, and the like (none of the above is shown). FIG. 12 is a flow chart showing the process carried out by the degradation determining circuit 110a.

The flow chart shown in FIG. 12 is executed at a regular predetermined time interval by the degradation determining circuit 110a. First, in step S1, a determination is made of time elapsed since the previous degradation determining mode operation. If the predetermined 2 week degradation determining interval has not elapsed since the previous degradation determining mode operation, the system advances to step S9, and one iteration of this flow chart is completed. This process makes it possible to prevent wasting of fuel, etc. caused by unnecessarily frequent execution of the degradation determining mode operation.

If the 2 week degradation determining interval or more has elapsed since the previous degradation determining mode operation, the system advances to step S2, and a judgment is made as to whether the solid oxide fuel cell 1 external environment is in a predetermined degradation determining atmosphere state appropriate to the degradation determining mode operation. Specifically, a determination is made as to whether the outside air temperature and outside air humidity detected by the outside air temperature sensor 150 (FIG. 6) and outside air humidity sensor (not shown) conform to predetermined condition. In the present embodiment, if the outside air temperature is 5-30° C. and the outside air humidity is 30-70%, the outside environment is judged to be in a degradation determining atmospheric state appropriate to the degradation determining mode operation. If it is judged that the external environment is not in the degradation determination outside atmospheric state, the system advances to step S9, and one iteration of this flow chart is completed.

When the outside environment is suited to the degradation determining mode operation, the system advances to step S3, and the degradation determining mode operation is started. Moreover, in step S4 certain values are fixed at predetermined supply amounts for which fuel, air, and water supply amounts are set in advance. In other words, in the degradation determining mode operation, the degradation determining circuit 110a controls the fuel flow rate regulator unit 38, the generating air flow rate regulator unit 45, and the water flow rate regulator unit 28 to maintain a fixed supply amount irrespective of the required generation amount being requested of the control section 110. At time t1 in FIG. 9 of the present embodiment, the degradation determining fuel supply amount is fixed at 3 L/min, the degradation determining oxidant gas supply amount at 100 L/min, and the degradation determining water supply amount at 8 mL/min.

These fixed values for the fuel, air, and water supply amounts are supply amounts obtained in advance by experiment as the amounts with 700 W, which is the rated output generation amount of the solid oxide fuel cell 1 of the present embodiment, can be generated. Therefore although there are individual differences between fuel cells, the solid oxide fuel cell 1 has the ability to output 700 W during the time when fuel, air, and water are supplied at these fixed values. However, if the power extracted from the fuel cell module 2 changes in response to the required generation amount, then even if the fuel supply amount etc. are fixed, the operating state of the fuel cell module 2 will not be sufficiently stable. A fixed power is therefore extracted from the fuel cell module 2 during the degradation determining mode, regardless of the required generation amount. Also, by extracting a fixed power regardless of the required generation amount, excess power that may be produced can is used to operate the auxiliary unit 4. It is also acceptable to sell extracted power in environments in which power generated by the solid oxide fuel cell 1 can be sold. It is also acceptable to furnish the solid oxide fuel cell 1 with a dummy load (not shown) such as a heater in order to consume power produced during the degradation determining mode operation and the generated power can be consumed by the dummy load.

Note that in the present embodiment the fixed values for fuel supply amount and the like are set at values corresponding to rated generation amount, but these fixed values can be set as desired. The fuel cell module 2 is preferably capable of being thermally autonomous, and can be set at a value permitting generation of power at close to the rated generation amount, with temperature varying sufficiently greatly according to the degree of degradation of the fuel cell module 2. It is desirable for the power extracted from the fuel cell module 2 during the degradation determining mode operation to be close to the rated generation amount.

Next, in step S5 of FIG. 12, after operation using fixed values has begun, a judgment is made as to whether sufficient time has elapsed and a stable operating state has been achieved. In the present invention, the operating state stabilizes when the degradation determining time of 5 hours has elapsed after starting operation according to fixed values, and a judgment is made that the predetermined degradation determining operating condition has been satisfied. If the fixed value-based time of 5 hours after start of operation has not elapsed, the step S5 process is repeated. Operation using fixed values started in step S4 is thus maintained over a period of 5 hours (FIG. 9, times t1-t2).

After fixed value-based operation has continued for 5 hours, the system advances to step S6 at time t2 in FIG. 9, and a judgment is made as to whether the temperature of the fuel cell unit 16 measured by the generating chamber temperature sensor 142 serving as temperature detection means is equal to or greater than a predetermined temperature or not. In other words, degradation of the fuel cell module 2 is determined by comparing the temperature of the fuel cell unit 16 resulting from operation of the fuel cell module 2 in a stable state with a reference temperature serving as a predetermined degradation determination reference value. In the solid oxide fuel cell 1 of the present embodiment, the reference temperature T0 of the fuel cell module 2 when operated at rated power of 700 W in the initial state is approximately 700° C.; as degradation of the fuel cell module 2 progresses, this temperature rises. This is caused by degradation of the fuel cell units 16 themselves, which are individual solid oxide fuel cells, and by joule heating and the like due to increased internal resistance of the fuel cell stack 14 as the result of degradation in the junction portion which electrically connects the various fuel cell units 16.

In the present embodiment, the degradation determining circuit 110a determines that the fuel cell module 2 has degraded when the temperature T1 measured by the generating chamber temperature sensor 142 is 30° C. or more above the reference temperature T0. If the fuel cell module 2 has not degraded, the system advances to step S10, and one iteration of this flow chart process is completed; no change is made to operating condition such as fuel supply amount.

If it is determined that a fuel cell module 2 has degraded, the system advances to step S7, and degradation processing is started. In step S7 a fuel supply correction is executed by the fuel correction circuit 110b (FIG. 6), which is a fuel correction means built into the control section 110, and the fuel supply amount and fuel supply amount gain relative to the required generation amount are changed. In other words, when it is determined for the first time after the start of use of the solid oxide fuel cell 1 that the fuel cell module 2 has degraded, the fuel correction circuit 110b changes the fuel supply amount relative to the required generation amount using the fuel supply correction from the curve F0 to the curve F1 in FIG. 10, and thereafter determines the fuel supply amount using the curve F1. The rate of change when changing the fuel supply amount is changed from line F10 to more gradual line F11 in FIG. 10, and thereafter the fuel supply amount is changed using this rate of change. The fuel supply amount changed by the fuel supply correction is maintained until it is determined that the fuel cell module 2 has further degraded. Note that the fuel correction circuit 110b comprises a microprocessor, memory, a program for activating same, and the like (none of the above is shown).

When the fuel cell module 2 degrades, the temperature of the fuel cell unit 16 rises when outputting the same power, so if one attempts to obtain the same rated power as at the initial use of the solid oxide fuel cell 1, the fuel cell unit 16 temperature rises and degradation is caused to advance even further. Therefore when it is determined that a fuel cell module 2 has degraded, the curve which determines fuel supply amount is changed by fuel supply correction from curve F0 in FIG. 10 to curve F1, in which the fuel supply amount is reduced by 8% relative to curve F0. After this fuel supply correction, the fuel supply amount is reduced relative to the same required generation amount, and the power actually output relative to required generation amount is reduced. After fuel supply correction, the actual output power of the fuel cell module 2 relative to the required generation amount of 700 W, which is the initial rated output power, becomes a reduced new rated output power. By reducing the fuel supply amount, excessive rises in the fuel cell module 2 temperature are prevented. A sudden change to the amount of fuel supplied to a degraded fuel cell module 2 can lead to further degradation, therefore the rate of change in the fuel supply amount is made smaller.

In the solid oxide fuel cell 1 of the present embodiment, when it is determined that a fuel cell module 2 has degraded, a correction is executed to decrease the rated output power so that the fuel supply amount is decreased. If degradation of the fuel cell module 2 advances and the fuel cell module 2 is determined to have degraded further, a correction is executed by the fuel correction circuit 110b according to the condition described below.

Note that when the fuel correction circuit 110b applies another decreasing correction to the fuel supply amount, the fuel supply amount is changed from the curve F1 to the curve F2, and if there is still another decreasing correction, it is changed from curve F2 to curve F3. The fuel supply amount in curve F2 is decreased 20% relative to curve F0, and 33% in curve F3 relative to curve F0. Thus the amount of decrease in the fuel supply amount from one correction is restricted to be at a predetermined maximum or below. Excessive burden on the fuel cell units 16 in which degradation is progressing can in this way be prevented. The fuel supply amount gain is also changed from line F11 to line F12 on the second execution of an increasing correction, and from line F12 to line F13 on the third execution of an increasing correction.

Thus in the present embodiment the amount of decrease to the fuel supply amount when executing a decreasing correction is a pre-set fixed value. Corrections greatly in error can therefore be prevented from occurring, unlike, for example, when the fuel supply amount correction amount is calculated based on the temperature rise in the fuel cell unit 16, or based on the amount of reduction in output power. In other words, the temperature or output power of the fuel cell unit 16 are affected by various factors which change their values, so calculating the amount of correction based on these values results in the execution of anomalous corrections when an anomalous temperature or output power is measured due to some factor.

After the fuel supply amount is corrected, the system advances to step S8; in step S8, the temperature T2 of the fuel cell units 16 when the solid oxide fuel cell 1 is operated using the post-correction fuel supply amount is measured by the generating chamber temperature sensor 142. The measured temperature T2 is stored in the degradation determining circuit 110a memory (not shown) as a new reference temperature T0. This new reference temperature T0 is used as the reference temperature for the next degradation determination. Preferably, the temperature T2 of the fuel cell units 16 measured after operation is conducted with the fuel supply amount at a fixed level for a predetermined time following correction of the fuel supply amount. This enables an accurate temperature measurement which excludes the effects of changes to the fuel supply amount by corrections.

When the degradation processing described above is completed, the degradation determining circuit 110a ends the degradation determining mode operation, and the control section 110 resumes normal operation responsive to the required generation amount (FIG. 9, time t2).

Figure 13:
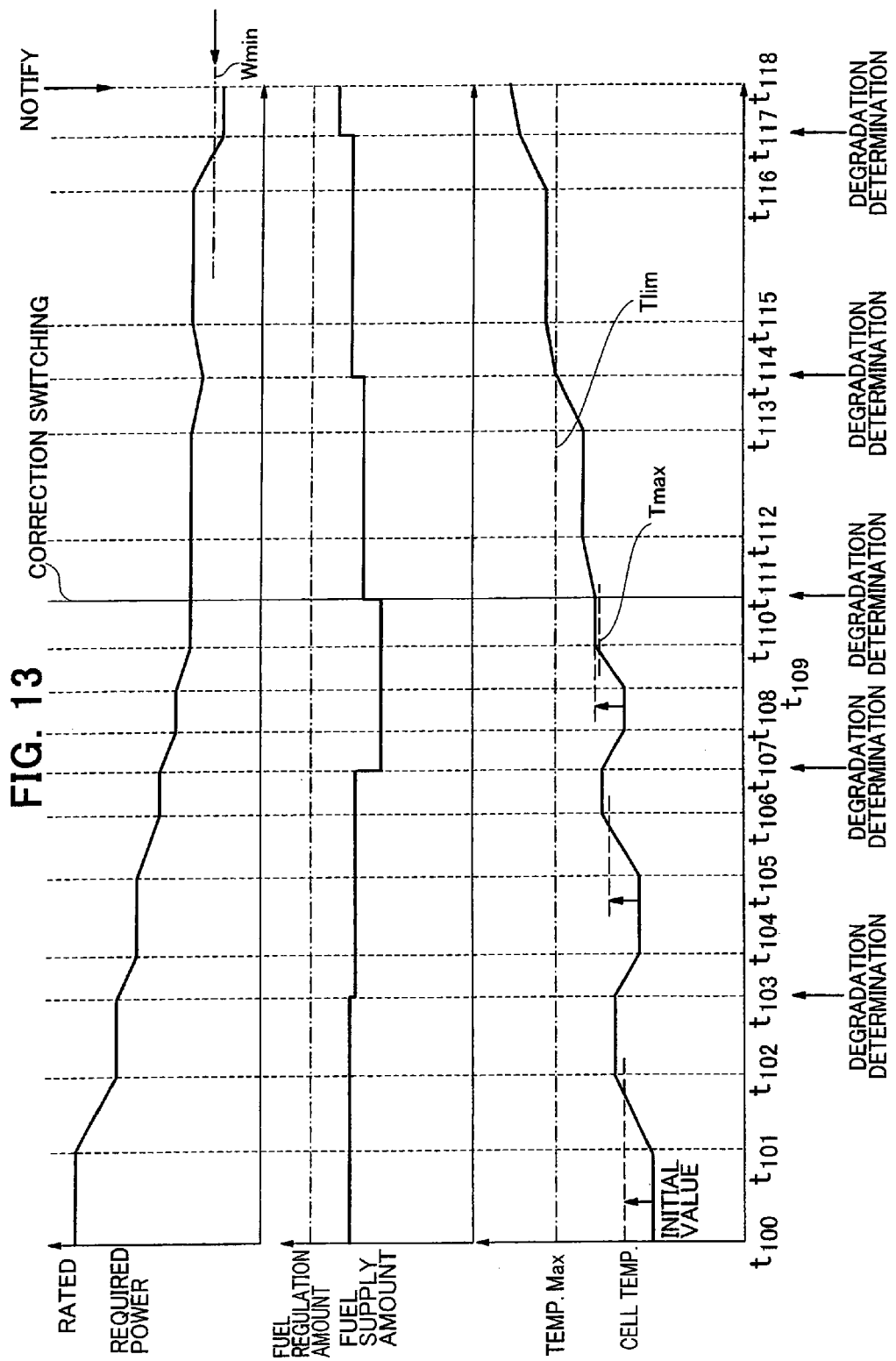
FIG. 13: A timing chart showing an example of fuel supply amount using the fuel correction circuit.
Figure 14:
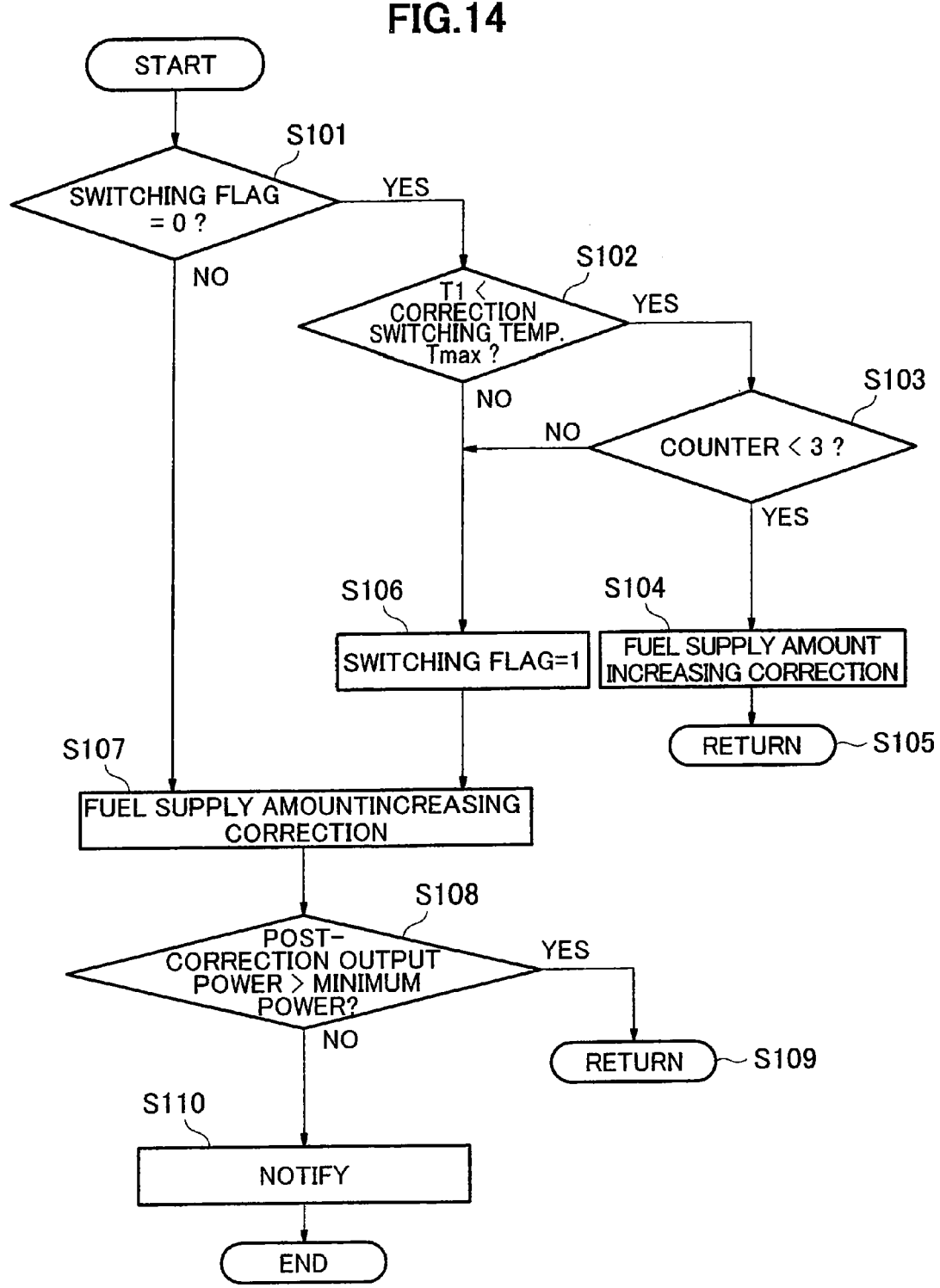
FIG. 14: A flow chart showing processing by the fuel correction circuit.

Next, referring to FIGS. 13 and 14, we discuss details of a fuel correction by the fuel correction circuit 110b. FIG. 13 is a timing chart showing an example of fuel supply amount using the fuel correction circuit 110b. FIG. 14 is flow chart showing processing by the fuel correction circuit 110b. Note that FIG. 13 is a timing chart showing time on the horizontal axis, and output power, fuel supply amount, and fuel cell unit temperature on the vertical axis; more than the timing chart in FIG. 9, this chart shows the fuel cell operating state schematically over an extremely long time period. Also, because the timing chart is simplified, the solid oxide fuel cell 1 is depicted as always being operated at rated output power. The flow chart in FIG. 14 is a subroutine called by step S7 in the flow chart shown in FIG. 12.

First, at time t100 in FIG. 13, initial use of the solid oxide fuel cell 1 is started. At the time of initial operation, the rated output power is obtained by operating the solid oxide fuel cell 1 at a specified fuel supply amount; the temperature at this point is stored in the degradation determining circuit 110a as the initial reference temperature T0 for fuel cell units 16. When the solid oxide fuel cell 1 usage period becomes lengthy, degradation of the fuel cell module 2 begins, and output power relative to the same fuel supply amount declines, while the temperature of the fuel cell units 16 also rises (times t101-t102 in FIG. 13).

Next, at time t103, a degradation determination is carried out and the flow chart shown in FIG. 12 is executed. At time t103, the temperature of the fuel cell unit 16 during rated output power operation has risen 30° C. or more above the reference temperature T0 (the temperature at time t100), therefore processing transitions from step S6 to step S7 in FIG. 12, and the subroutine shown in FIG. 14 is called.

In step S101 of FIG. 14, the value of the switching flag FL1 is determined. In the solid oxide fuel cell 1 initial state, the switching flag FL1 is set to 0, therefore processing moves to step S102. In step S102, a determination is made of the temperature T1 of the fuel cell unit 16 at time t103. In other words, if, when the required generation amount is the rated power, the temperature T1 of the fuel cell units 16 is less than the correction switching temperature Tmax, which is a predetermined correction switching condition, the system advances to step S103, and if the temperature T1 is equal to or greater than the correction switching temperature Tmax, the system advances to step S106. Note that in the present embodiment, the correction switching temperature Tmax is set to 800° C.

In step S103, the value of the decreasing correction iteration counter is determined. The decreasing correction iteration counter is a counter for totaling the number of iterations of decreasing corrections to the fuel supply amount after the initial start of use. If the number of decreasing corrections is less than 3, the system advances to step S104; if 3 or greater, it advances to step S106.

In step S104, the fuel supply amount is corrected to decrease (time t103 in FIG. 13) so that degradation of the degraded fuel cell module 2 does not advance, and the decreasing correction iteration counter is increased by 1. At this point, if this is the first decreasing correction, the curve determining the fuel supply amount is changed from curve F0 to curve F1 in FIG. 10, and the decreasing correction iteration counter value is changed from a 0 to a 1. The temperature when a predetermined time has elapsed after a decreasing correction to the fuel supply amount (the temperature at times t104-t105 in FIG. 13) is updated and stored as a new reference temperature T0 (step S8 in FIG. 12). As a result of this decreasing correction to the fuel supply amount, the rated output power actually output by the solid oxide fuel cell 1 declines, as does the temperature of the fuel cell units 16 (times t103-t105 in FIG. 13).

When a further solid oxide fuel cell 1 usage period has elapsed, degradation of the fuel cell module 2 advances further, and output power relative to fuel supply amount declines, while the temperature of the fuel cell unit 16 also rises (times t105-t106 in FIG. 13). Next, at time t107, a degradation determination is performed. At time t107, the temperature of the fuel cell unit 16 during rated output power operation has risen 30° C. or more above the updated reference temperature T0 (the temperature at times t104-t105), therefore processing transitions from step S6 to step S7 in the flow chart shown in FIG. 12. In step S7, the flow chart shown in FIG. 14 is executed, then steps S101, S102, S103, and S104 are executed in sequence. If this is the second decreasing correction, the curve determining the fuel supply amount is changed from curve F1 to curve F2 in FIG. 10, the decreasing correction iteration counter value is changed from a 1 to a 2, and the fuel supply amount is further decreasingly corrected (time t107 in FIG. 13). Here the reduction range for the fuel supply amount in the correction executed at time t107 is set to be larger than the reduction range for the fuel supply amount in the correction executed previously at time t103. As a result of this decreasing correction to the fuel supply amount, the rated output power actually output by the solid oxide fuel cell 1 declines, as does the temperature of the fuel cell units 16 (times t107-t108 in FIG. 13).

When degradation of the fuel cell module 2 further advances, the output power of the solid oxide fuel cell 1 declines, and the temperature of the fuel cell units 16 increases (times t109-t110 in FIG. 13). Next, at time t111, a degradation determination is performed.

At time t111, the temperature of the fuel cell unit 16 during rated output power operation has risen 30° C. or more above the updated reference temperature T0 (the temperature at times t108-t109), therefore processing transitions from step S6 to step S7 in the flow chart shown in FIG. 12. In step S7, the flow chart shown in FIG. 14 is executed, then steps S101 and S102 are executed in sequence. In step S102, the temperature T1 of the fuel cell units 16 at time t111 exceeds the correction switching temperature Tmax, therefore the system moves to step S106.

In step S106, the switching flag FL1 value is changed from a 0 to a 1. The switching flag FL1 is a flag indicating whether the fuel correction circuit 110b is executing a correction to reduce the rated output power so that the fuel supply amount is reduced. When the value of the switching flag FL1 is a 0, a decreasing correction is applied to the fuel supply amount; when the switching flag FL1 value is switched to a 1, the fuel correction circuit 110b causes the fuel supply amount to increase, and executes a correction in the direction of maintaining the diminished rated output power (step S107 in FIG. 14). Thus, after the correction switching condition is satisfied, i.e., after the correction switching temperature Tmax is exceeded, the fuel correction circuit 110b increases the fuel supply amount and executes a correction so that the rated output power does not decline any further.

Note that in the timing chart shown in FIG. 13, the temperature of the fuel cell unit 16 during rated output power operation exceeds the correction switching temperature, therefore the switching flag FL1 value is changed from 0 to 1, but the switching flag FL1 value is also changed from 0 to 1 in cases where a decreasing correction has been applied to the fuel supply amount over the last three iterations (step S103 in FIG. 14), and thereafter a correction is executed to increase the fuel supply amount.

Next, in step S107, a correction to increase the fuel supply amount is executed so as to maintain the rated output power being diminished (the output power at times t108-t109 in FIG. 13). Specifically, the fuel correction circuit 110b increases the fuel supply amount by a pre-set fixed value only (time t111 in FIG. 13). At the same time as this increasing correction of the fuel supply amount is performed, output power is maintained, and the temperature of the fuel cell units 16 increases (times t111-t112 in FIG. 13).

Here we discuss the relationship between correction of the fuel supply amount and rated power. Rated power means the maximum power output from the fuel cell module 2; in the present embodiment, rated power is sequentially decreased (times t100-t108 in FIG. 13) to match the advancing degradation of the fuel cell module 2. The power output from the fuel cell module 2 is, specifically, controlled by the inverter 54. That is, even if fuel is supplied to the fuel cell module 2 and the fuel cell module 2 is in a state whereby power can be extracted from it, power will not be output unless the inverter 54 extracts current from the fuel cell module 2.

The control section 110 controls the fuel flow rate regulator unit 38 to supply fuel to the fuel cell module 2 in response to a required generation power. The control section 110 also controls the inverter 54 to extract power from the fuel cell module 2 proportional to the supplied fuel within the range of the rated power. When the fuel cell module 2 is in a degraded state, the power which can be extracted for the same fuel supply amount without damaging the fuel cell module 2 is reduced. Therefore in times such as after the temperature of the fuel cell units 16 exceeds the correction switching temperature Tmax, a correction is carried out to increase the fuel supply amount on the one hand, while the power extracted by the inverter 54 from the fuel cell module 2 is maintained at the same value. Put another way, the fuel supply amount which is increased by correction is pre-set at a value which allows the previous rated power to be output even after degradation of the fuel cell module 2 has advanced.

However, depending on the degree to which degradation of the fuel cell module 2 has advanced, and on solid oxide fuel cell 1 operating condition such as outside air temperature, etc., there may be cases in which the previous rated power cannot be extracted, even in a state in which the fuel supply amount has been corrected upward. In such cases, extracting current using the inverter 54 in order to extract the rated power from the fuel cell module 2 will cause the fuel cell module 2 output voltage to begin to decline. Increasing the current extracted by the inverter 54 so as to extract the rated power in this state may cause degradation of the fuel cell module 2 to advance extraordinarily, or may damage the fuel cell module 2. The control section 110 therefore monitors the output voltage of the fuel cell module 2, and when the output voltage declines to a predetermined value, it stops the increase in the current extracted by the inverter 54. In such cases, even if the fuel cell module 2 is being operated based on a particular reduced rated power (e.g. the rated power at times t108-t109 in FIG. 13), the power which is actually output is approximately several watts lower than the rated power. In this specification, the state in which "rated power is maintained" includes the state in which, although outputting a certain rated power in this way is held as a goal, the power which is actually output is slightly offset from the rated power due to operating condition and the like.

Furthermore, in step S108, after an increasing correction of the fuel supply amount is performed, a determination is made of the output power value (the power at times t112-t113 in FIG. 13). When the post-increasing correction output power is larger than a predetermined minimum power Wmin, the system advances to step S109, and one iteration of the FIG. 14 flow chart is completed. If the output power is the predetermined minimum power Wmin or less, the system advances to step S110.

When a further usage period elapses, degradation of the fuel cell module 2 advances further, and output power relative to fuel supply amount declines, while the temperature of the fuel cell unit 16 also rises (times t113-t114 in FIG. 13).

Next, at time t114, a degradation determination is performed; if it is determined that further degradation of the fuel cell module 2 has occurred, steps S101 and S107 in the FIG. 14 flow chart are executed in sequence. At step S107, the fuel correction circuit 110b further increases the fuel supply amount by a pre-set fixed value only (time t114 in FIG. 13). This increasing correction of the fuel supply amount causes output power to recover, while at the same time the temperature of the fuel cell units 16 increases (times t114-t115 in FIG. 13). The recovered output power (the output power at times t115-t116 in FIG. 13) is larger than the minimum power Wmin, therefore the system advances to step S109, and one iteration of the processing the FIG. 14 flow chart is completed.

When a further usage period elapses, degradation of the fuel cell module 2 advances further, and output power relative to fuel supply amount declines, while the temperature of the fuel cell unit 16 also rises (times t116-t117 in FIG. 13).

Next, at time t117, a degradation determination is performed; if it is determined that further degradation of the fuel cell module 2 has occurred, steps S101 and S107 in the FIG. 14 flow chart are executed in sequence. At step S107, the fuel correction circuit 110b further increases the fuel supply amount (time t117 in FIG. 13). However, because degradation of the fuel cell module 2 is advancing, there is no recovery of the output power, and only the temperature of the fuel cell units 16 rises (times t117-t118 in FIG. 13).

Next, in step S108, the post-increasing correction output power (the output power at time t118 in FIG. 13) is compared to the minimum power Wmin. At time t118, the output power is at or below the minimum power Wmin, so the system advances to step S110. In step S110, the control section 110 sends a signal to the warning device 116 to inform users that the solid oxide fuel cell 1 has reached its product life, and stops operation of the fuel cell module 2.

In the solid oxide fuel cell 1 of this embodiment of the present invention, a correction is executed to reduce the rated output power so that the fuel supply amount is reduced when a degradation determination is made (times t103, t107 in FIG. 13), therefore further advance of degradation of the fuel cell module 2 is restrained. When degradation advances and correction switching condition is satisfied (time t111 in FIG. 13), the fuel supply amount is increased so as to maintain the reduced rated output power (times t111, t114 in FIG. 13), therefore the time period over which the minimum rated output power is maintained can be extended.

In the solid oxide fuel cell 1 of this embodiment of the present invention, a correction to reduce the rated output power is executed (times t103, t107 in FIG. 13) before the correction switching condition is satisfied, therefore fuel cell module 2 performance is prevented from declining, but at the initial period thereof the range of reduction in output power is reduced (time t103) so that the decline in output is not noticeable. On the other hand, after degradation has progressed to some degree, the fuel supply amount is greatly reduced (time t107), and emphasis is placed on preventing further degradation of the fuel cell module 2. This makes it possible both to extend the number of years of usable fuel cell module life, and to maintain output power.

Furthermore, using the solid oxide fuel cell 1 of the present embodiment, correction is executed so that the temperature of the fuel cell units 16 does not rise prior to satisfaction of predetermined correction switching condition (times t103-t104 and t107-t108 in FIG. 13). There is a tendency for fuel cell units 16 temperatures to rise with the advance of degradation, and degradation of the solid oxide fuel cell units 16 may advance due to temperature rises. In the present embodiment, temperature rises are prevented and increased burden on the fuel cell units 16 is avoided, therefore degradation of fuel cell units 16 can be delayed. This makes it possible to extend the number of years of usable fuel cell module 2 life.

In the solid oxide fuel cell 1 of the present embodiment, correction is executed so that the temperature of the fuel cell units is reduced prior to satisfaction of predetermined correction switching condition (times t103-t104 and t107-t108 in FIG. 13), therefore the burden on the solid oxide fuel cell units 16 is actively reduced, and the usable life of a fuel cell module 2 can be greatly extended.

Furthermore, using the solid oxide fuel cell 1 of the present embodiment, the predetermined correction switching condition is the temperature of the fuel cell units 16, therefore the degradation of the fuel cell module 2 is directly reflected, and an accurate degradation determination can be performed.

Furthermore, in the above-described embodiment the degradation determining circuit 110a determined degradation of the fuel cell module 2 using the temperature of the fuel cell unit, but it would also be acceptable as a variation for the degradation determining circuit 110a to determine degradation of the fuel cell module 2 based on the fuel cell module 2 output power when the fuel cell module 2 is operated under predetermined degradation determining operating condition. In such cases, the fuel correction circuit 110b corrects the fuel supply amount supplied to the fuel cell module 2 so as to maintain the fuel cell module 2 rated output power when the fuel cell module 2 output power declines to a predetermined correction switching power or below.

In the above-described embodiment, a fixed power was being extracted from the fuel cell module 2 during the degradation determining mode operation, but it would also be acceptable as a variation to constitute a solid oxide fuel cell 1 so that power was not extracted during the degradation determining mode operation. In such cases, a determination of fuel cell module 2 degradation is made based on the fuel cell module 2 voltage, and once the fuel cell module 2 output voltage drops to the correction switching voltage or below, the fuel correction circuit 110b corrects the fuel supply amount supplied to the fuel cell module 2 so as to maintain the rated output power of the fuel cell module 2.

Also, in the above-described embodiment the reference temperature is renewed after the fuel supply amount was corrected, and a determination of further degradation of the fuel cell module is made based on this reference temperature, but it would also be possible as a variation to determine degradation based on output voltage. In such cases, the output power corresponding to the corrected fuel supply amount could be stored as the reference output power after a correction of the fuel supply amount was executed, then in the next degradation determination, a further degradation determination could be made of the fuel cell module based on this reference output power.

In this variation, a correction to increase the fuel supply amount supplied to the fuel cell module could also be executed when the fuel cell module output power declines to the correction switching power or below, after a decreasing correction is made to the fuel supply amount. The minimum rated output power could thus be maintained after the fuel supply amount had been decreased by correction.

Also, in this variation, the degradation determining circuit determines fuel cell module degradation based on fuel cell module output power when operated in predetermined degradation determining operating condition, therefore the accuracy of degradation determinations can be improved. Also, by determining fuel cell module degradation based on temperature and output power, degradation determination accuracy can be further improved. And determining degradation based on output power after the degradation determining circuit has operated at a fixed fuel supply amount, degradation determination accuracy can be improved. In addition, by storing a value for output power under post-correction operating condition and making a further determination of degradation after the fuel supply amount is corrected, multiple iterations of degradation determination can be carried out, while false determinations are prevented.

In addition, in the above-described embodiment, correction is executed to decrease the fuel supply amount when the first degradation is determined, and correction is executed to increase the fuel supply amount after the predetermined correction switching condition is satisfied, but it is also possible as a variation to make decreasing corrections and increasing corrections to the fuel supply amount, and thereafter to again execute a decreasing correction in accordance with predetermined condition.

We have explained preferred embodiments of the present invention above, but various changes may be added to the above-described embodiments. In particular, in the above-described embodiment the solid oxide fuel cell is constituted to change the output power in response to the required generation amount, but the present invention can be applied to a solid oxide fuel cell in which a fixed rated output power is output constantly.

As a variation, the fuel supply amount could be controlled after predetermined correction switching condition is reached to maintain a constant maximum temperature Tlim rather than executing increasing corrections of the fuel supply amount when the fuel cell unit temperature exceeds the predetermined maximum temperature Tlim. In other words, in the above-described embodiment, when it is determined at time t114 in FIG. 13 that the fuel cell module has degraded, a correction is executed to increase the fuel supply amount. In this variation, if the maximum temperature is set, for example, at Tlim in FIG. 13, an increasing correction of the fuel supply amount is not executed at time t114; rather the fuel supply amount is adjusted so that the fuel cell unit temperature is maintained at the maximum temperature Tlim. Subsequent degradation determinations by a degradation determining circuit are not executed. Thus, after predetermined correction switching condition is reached, subsequent control is performed using the output power at the maximum temperature Tlim as the rated output power, therefore operation exceeding the maximum temperature Tlim can be avoided, and promotion of fuel cell degradation can be prevented.

Furthermore, after the predetermined correction switching condition is reached, the fuel supply amount may be corrected using a predetermined fuel supply amount as a maximum value. Wasted fuel and excessive temperature rises in the fuel cell units due to excess supply of fuel can thus be avoided.

EXPLANATION OF REFERENCE NUMERALS

1: Solid oxide fuel cell
2: Fuel cell module
4: Auxiliary unit
8: Sealed space
10: Electrical generating chamber
12: Fuel cell assembly
14: Fuel cell stack
16: fuel cell units (solid oxide fuel cells)
18: Combustion chamber
20: Reformer
22: Heat exchanger for air
24: Water supply source
26: Pure water tank
28: Water flow rate regulator unit (water supply means)
30: Fuel supply source
38: Fuel flow rate regulator unit (fuel supply means)
40: Air supply source
44: Reforming air flow rate regulator unit
45: Generating air flow rate regulator unit (oxidant gas supply means).
46: First heater
48: Second heater
50: Hot water production device
52: Control box
54: Inverter
83: Ignition device
84: Fuel cells
110: Control section (controller, control means)
110a: Degradation Determining Circuit (degradation determining means)
110b: Fuel correction circuit (fuel correction means)
112: Operating device
114: Display device
116: Warning device
126: Power state detection sensor
142: Generating chamber temperature sensor (temperature detection means)
150: Outside air temperature sensor

The invention claimed is:

1. A solid oxide fuel cell system comprising:
a fuel cell module comprising multiple fuel cell units;
a fuel supply device that supplies fuel to the fuel cell module according to a fuel supply function which defines a relationship between a demand for output power from the solid oxide fuel cell system and an amount of fuel supply to the fuel cell module for meeting the demand;
an oxidation gas supply device that supplies oxidation gas to the fuel cell module; and
a controller programmed to control an amount of fuel supplied from the fuel supply device;
wherein the controller comprises a degradation determining circuit that determines whether the fuel cell module has degraded to a predetermined degree of degradation, and a fuel correction circuit that corrects the fuel supply function to adjust the amount of the fuel supply, based on a result of determination performed by the degradation determining circuit; and
wherein the fuel correction circuit is programmed to perform correction of the fuel supply function, if the degradation circuit determines that the fuel cell module has degraded to the predetermined degree, in such a way that if a predetermined correction switching condition is not satisfied, the fuel correction circuit corrects the fuel supply function to decrease the fuel supply to the fuel cell module to thereby reduce a maximum rated power output from the fuel cell module, and if the predetermined correction switching condition is satisfied, the fuel correction circuit corrects the fuel supply function to increase the fuel supply to the fuel module to thereby prevent the maximum rated output power of the fuel cell module from further decreasing, and further wherein the predetermined correction switching condition is satisfied when one of the following is found true:

(a) a rise of an operation temperature of the fuel cell units to a predetermined threshold temperature or above;
(b) a decrease of the fuel supply to a predetermined threshold amount or below;
(c) a decrease of an output power of the fuel cell module to a predetermined threshold power or below; and
(d) a decrease of an output voltage of the fuel cell module to a predetermined threshold voltage or below.

2. The solid oxide fuel cell system of claim 1, wherein the fuel correction circuit is programmed to perform correction of the fuel supply function, in which before the predetermined correction switching condition is satisfied, the fuel correction circuit corrects the fuel supply function to reduce the fuel supply to the fuel cell module, and an amount of reduction of the fuel supply becomes progressively larger as the correction of the fuel supply is repeated.

3. The solid oxide fuel cell system of claim 1, wherein the fuel correction circuit is programmed to perform correction of the fuel supply function, in which before the predetermined correction switching condition is satisfied, the fuel correction circuit corrects the fuel supply function so that a temperature of the fuel cell units does not rise.

4. The solid oxide fuel cell system of claim 3, wherein the fuel correction circuit is programmed to perform correction of the fuel supply function, in which before the predetermined correction switching condition is satisfied, the fuel correction circuit corrects the fuel supply function so that the temperature of the fuel cell units declines.

* * * * *